(12) United States Patent
Jackson

(10) Patent No.: US 10,878,206 B1
(45) Date of Patent: Dec. 29, 2020

(54) ATTENDANCE MONITORING SYSTEM AND A METHOD FOR MONITORING PRESENCE OF CHILDREN IN A VEHICLE

(71) Applicant: Cynthia Jackson, Dallas, TX (US)

(72) Inventor: Cynthia Jackson, Dallas, TX (US)

( * ) Notice: Subject to any disclaimer, the term of this patent is extended or adjusted under 35 U.S.C. 154(b) by 0 days.

(21) Appl. No.: 16/555,021

(22) Filed: Aug. 29, 2019

(51) Int. Cl.
*G06K 7/10* (2006.01)

(52) U.S. Cl.
CPC .............................. *G06K 7/10366* (2013.01)

(58) Field of Classification Search
CPC .... G06K 7/10366; G08C 17/02; G08G 1/202; G06Q 10/00; G08B 21/0227
USPC ...................................... 235/451; 340/539.13
See application file for complete search history.

(56) References Cited

U.S. PATENT DOCUMENTS

| | | | |
|---|---|---|---|
| 7,262,696 B2 * | 8/2007 | Aota ...................... | G08G 1/202 340/433 |
| 8,353,705 B2 | 1/2013 | Dobson et al. | |
| 10,482,691 B1 * | 11/2019 | McCluskey ........ | G08B 21/0227 |
| 2007/0229217 A1 * | 10/2007 | Chen ....................... | G06Q 10/00 340/5.61 |
| 2013/0127616 A1 * | 5/2013 | Robitaille .............. | G08C 17/02 340/539.13 |

* cited by examiner

*Primary Examiner* — Daniel A Hess
(74) *Attorney, Agent, or Firm* — Sanchelima & Associates, P.A.; Christian Sanchelima; Jesus Sanchelima

(57) ABSTRACT

An attendance monitoring system for monitoring presence of children in a vehicle is disclosed herein. The attendance monitoring system comprises a processor and a memory mounted to the processor. Furthermore, the attendance monitoring system comprises a card reader mounted at an entrance of the vehicle. The card reader comprises a first actuator and a second actuator. The attendance monitoring system further comprises a plurality of identity cards, each configured to uniquely identify a child. The first actuator is actuated by the child when entering the vehicle, and the second actuator is actuated by the child when exiting the vehicle. Additionally, the card reader transmits signals to the processor upon detecting the identity card associated with the child and activation of the first actuator and the second actuator. The processor is used to monitor presence of the children in a vehicle based on the number of identity cards detected.

9 Claims, 4 Drawing Sheets

ATTENDANCE MONITORING SYSTEM AND A METHOD FOR MONITORING PRESENCE OF CHILDREN IN A VEHICLE

BACKGROUND OF THE INVENTION

1. Field of the Invention

The present disclosure generally relates to attendance monitoring systems. More specifically, the present disclosure relates to an attendance monitoring system for monitoring presence of children in a vehicle.

2. Description of the Related Art

It is known that vehicles capable of carrying many passengers such as buses are commonly used to transport people from one place to another. For example, the vehicles are used to transport children between their homes and schools. Generally, when the children are transported, a driver of the vehicle manually keeps a record of number of children present in the vehicle. At times, it may become difficult to manually count the number of children present in the vehicle. Further, it may become difficult for the driver to remember names of each child and their parents' names and may fail to contact them in case of any emergency.

In order to monitor the number of people or children present in the vehicle or building, several solutions have been proposed in the past. One such solution is disclosed in a United States granted U.S. Pat. No. 8,353,705. In U.S. Pat. No. 8,353,705B2, an automated attendance monitoring system is disclosed. The system includes identification tags, with wireless communication capabilities, for each potential attendee, scanners for detecting the attendees' tags as they enter a given room, at least one server in communication with the scanners, handheld computing devices for use by attendance trackers, such as teachers, to verify a provisional attendance report generated by the scanners and server, and software running on the server for receiving and managing the attendance data received from the scanners, and for generating attendance reports. Although particularly well-suited for tracking attendance in schools, the present invention can also be used in a variety of other settings where there is a need to track the whereabouts of a number of individuals. Although the attendance monitoring system discussed above is capable of monitoring a number of people present in the vehicle or building, it has few problems. For instance, the above disclosure does not discuss updating the driver of the vehicle the details of the child that entered or exited the vehicle. Further, the above disclosure requires complex infrastructure such as servers and sending messages to parents, which increases the cost of monitoring the presence of the children in the vehicle. The present invention addresses these issues by providing an easy to use configuration wherein a display unit provides a driver with valuable information of the children onboard the vehicle.

Other documents describing the closest subject matter provide for a number of more or less complicated features that fail to solve the problem in an efficient and economical way. None of these patents suggest the novel features of the present invention. Specifically, none of the disclosures in the art disclose an attendance monitoring system that can be implemented in a vehicle without spending much on the infrastructure. Further, none of the disclosures in the art disclose an attendance monitoring system that discloses the children updating the driver of their entering and exiting from the vehicle and thereby helping the driver to monitor presence of children in the vehicle.

SUMMARY OF THE INVENTION

It is one of the main objects of the present invention to provide an attendance monitoring system for monitoring presence of children in a vehicle and that avoids the drawbacks of the prior art.

It is one object of the present invention to provide an attendance monitoring system in which each of the children is provided with a unique identification card, which allows updating a driver or user of the attendance monitoring system to monitor presence of the children in the vehicle.

It is another object of the present invention to provide an attendance monitoring system for monitoring presence of the children in a vehicle and checking the details of each child as they enter or exit the vehicle.

It is another object of the present invention to provide an attendance monitoring system to ensure that no child is left behind in the vehicle and ensures safety of the child in the vehicle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

Various features and embodiments of an attendance monitoring system for monitoring presence of children in a vehicle are explained in conjunction with the description of FIGS. 1-5.

Figure 1:
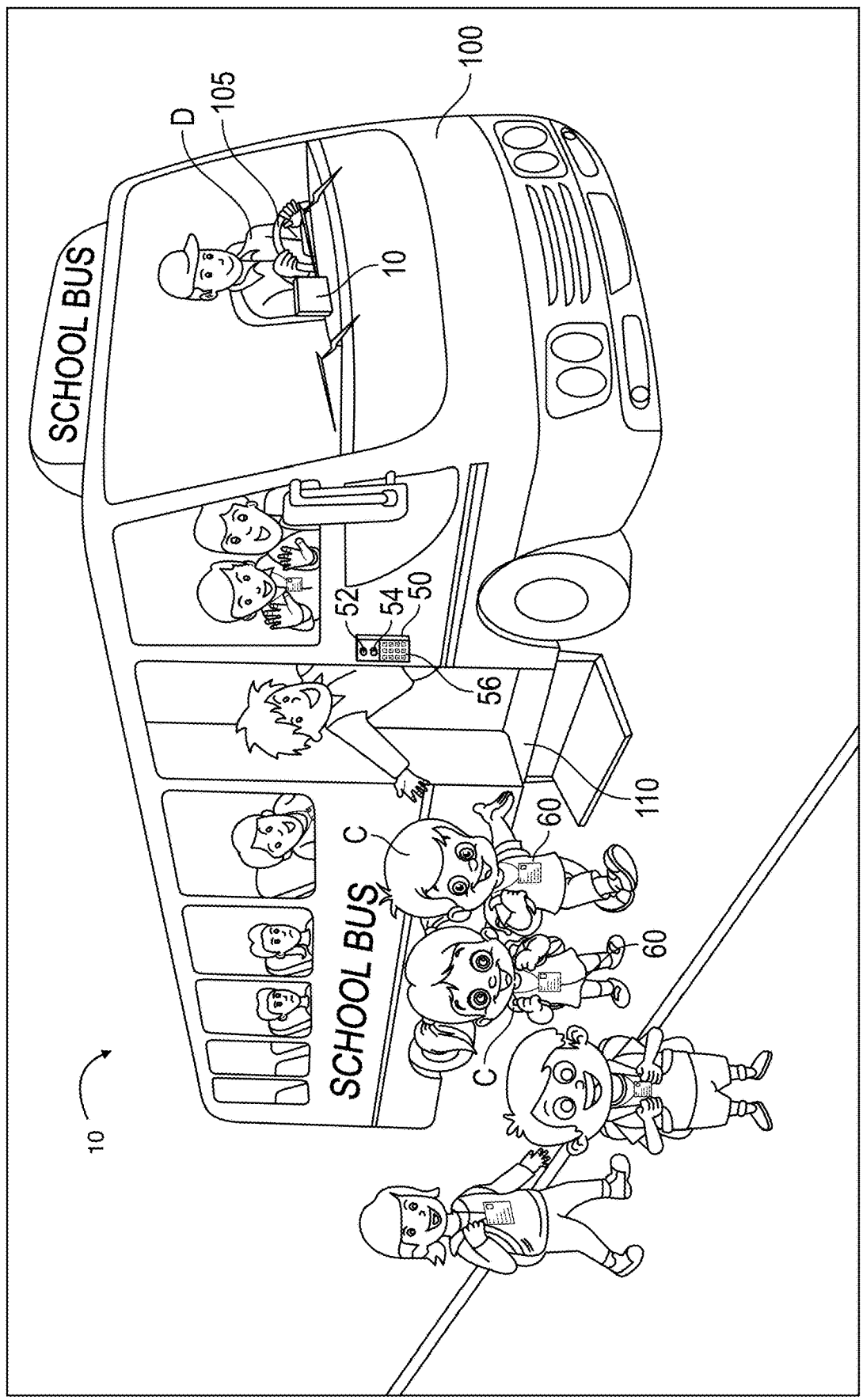
FIG. 1 illustrates a scenario in which an attendance monitoring system 10 for monitoring presence of children in a vehicle 100 is implemented, in accordance with one embodiment of the present disclosure.

Referring to FIG. 1, a schematic diagram of an attendance monitoring system 10 implemented in a vehicle 100 is shown, in accordance with one embodiment of the present disclosure. As known, the vehicle 100 comprises a steering wheel 105 operated by a driver D. Further, the vehicle 100 comprises an entrance or access 110 for passengers to enter and exit from the vehicle 100. In one example, the entrance 110 may be provided with a door (not shown) to provide access to the vehicle 100.

In accordance with one embodiment of the present disclosure, the attendance monitoring system 10 is mounted in proximity to the steering wheel 105 or dashboard, as shown in FIG. 1. It should be understood that the attendance monitoring system 10 might be mounted in proximity to the steering wheel 105 or dashboard facing the driver D such that the driver D will be able to operate the attendance monitoring system 10 with his hands. The attendance monitoring system 10 may include a housing made up of metal, plastic or any other suitable material. It should be understood that the attendance monitoring system 10 might be provided in variety of shapes and sizes. Attendance monitoring system 10 allows a driver to be fully aware of every child that enters or leaves a vehicle. Additionally, attendance monitoring system 10 provides Driver D with an alert if a child is left behind.

Figure 2:
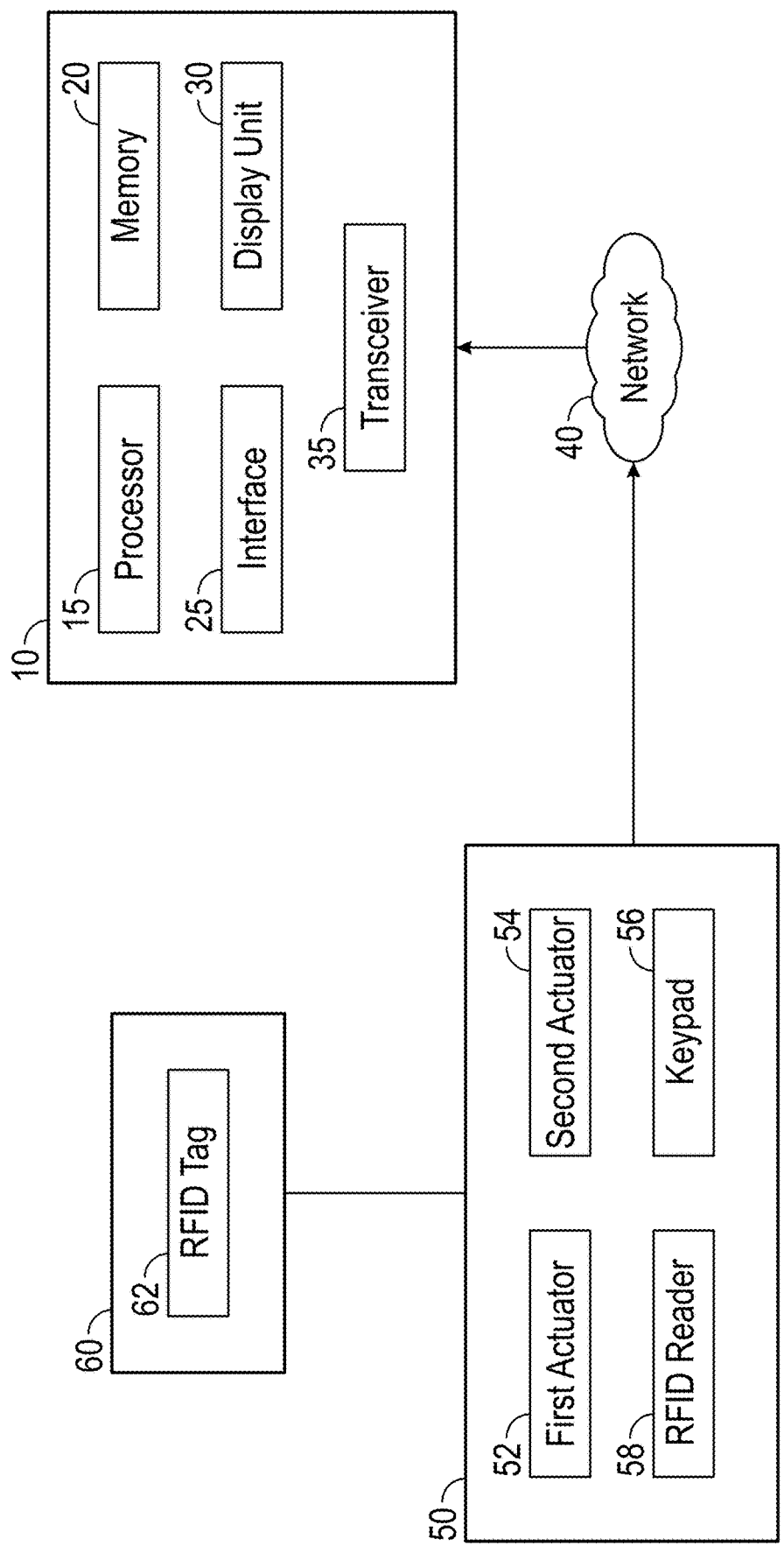
FIG. 2 illustrates a block diagram of the attendance monitoring system 10, in accordance with one embodiment of the present disclosure.

Referring to FIG. 2, the attendance monitoring system 10 comprises a processor 15, a memory 20, an interface 25, a display unit 30 and a transceiver 35. The processor 15 may be implemented as one or more microcontrollers, microcomputers, digital signal processors, central processing units, state machines, logic circuitries, and/or any devices that manipulate signals based on operational instructions. Among other capabilities, the processor 15 is configured to fetch and execute computer-readable instructions or program instructions stored in the memory 20. Furthermore, memory 20 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, and so on. Additionally, interface 25 may include a variety of software and hardware interfaces, for example, a web interface, a graphical user interface, and the like. Interface 25 may allow the attendance monitoring system 10 to interact with a user or customer directly or through other devices (not shown). In one example, the interface 25 may include a touch screen interface. To continue, display unit 30 may include a Light Emitting Diode (LED) or Liquid Crystal Display (LCD) screen configured to display text or video. The transceiver 35 is used to transmit and receive signal/data from the attendance monitoring system 10 to external devices such as servers or other devices such as a card reader 50. In one example, the attendance monitoring system 10 might be provided with a battery (not shown) to operate the attendance monitoring system 10. The battery may include a rechargeable battery such as a Lithium-Ion battery. In another example, the attendance monitoring system 10 might be provided with a port mounted to a battery (not shown) of the vehicle 100 to draw power for operating the attendance monitoring system 10. Additionally, attendance monitoring system 10 may include a GPS system to allow driver D to find the fastest route to a child's home address. Furthermore, attendance monitoring system 10 may include a software therein configured to work with the system. The software may be of any suitable software to cooperate with attendance monitoring system 10.

Now referring to FIGS. 1 and 2, the attendance monitoring system 10 comprises a card reader 50. The card reader 50 may indicate a housing made up of metal, plastic or any other material. It should be understood that the card reader 50 might be provided in variety of shapes and sizes. The card reader 50 might be mounted to the vehicle 100 at the entrance 110 as shown in FIG. 1. The card reader 50 might be removably or permanently mounted to the vehicle 100 using mechanism such as fastener, welding or any other known mechanism. The card reader 50 is mounted at the entrance 110 at a suitable height such that children will be able to reach the card reader 50 with or without help of an operator or caretaker in the vehicle 100. The card reader 50 is communicatively mounted to the attendance monitoring system 10 via a network 40. In one implementation, the network 40 may be a wireless network, a wired network or a combination thereof. The network 40 can be implemented as one of the different types of networks, such as intranet, local area network (LAN), wide area network (WAN), the internet, and the like. The card reader 50 further comprises a first actuator 52, a second actuator 54, a keypad 56 and a Radio-Frequency Identification (RFID) reader 58. The first actuator 52 may indicate a button or switch or toggle. In one example, the first actuator 52 may include a green button. Similarly, the second actuator 54 may indicate a button or switch or toggle. In one example, the second actuator 54 may include a red button. The keypad 56 may include a numeric or alphanumeric keypad. In one alternate embodiment, the card reader 50 may be provided with a biometric scanner (not shown) such as a fingerprint, retina scanner and so on.

In accordance with one embodiment of the present disclosure, the attendance monitoring system 10 further comprises a plurality of identity cards 60, each provided to a child. In other words, each of the children is provided with an identity card 60. Each of the identity cards 60 is provided with a Radio-Frequency Identification (RFID) tag 62. In order to configure the plurality of identity cards 60 to identify and monitor presence of each child in the vehicle 100, details of each child is stored in the attendance monitoring system 10. In other words, the details of each child are registered with the attendance monitoring system 10.

Figure 3:
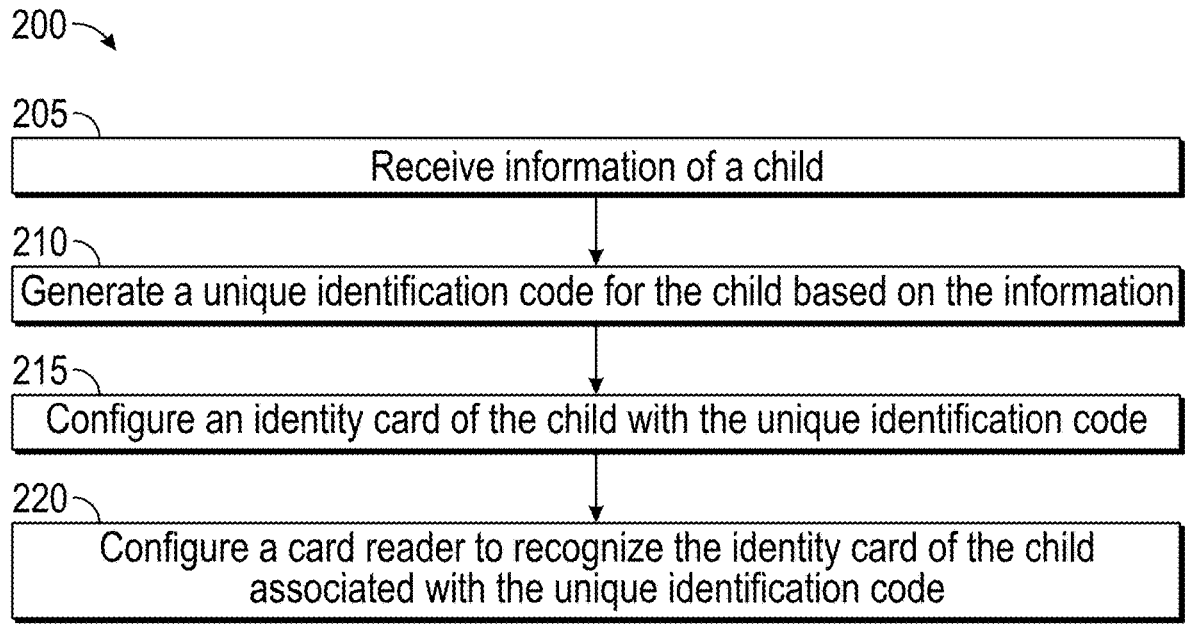
FIG. 3 illustrates a method 200 of registering information of a child C at the attendance monitoring system 10, in accordance with one embodiment of the present disclosure.

Referring to FIG. 3, a method 200 of registering details of each child at the attendance monitoring system 10 is explained. The method 200 may be described in the general context of computer executable instructions or a sequence of steps to be performed for automated checkout. However, the order in which the method 200 is described and is not intended to be construed as a limitation, and any number of the described method blocks can be combined in any order to implement the method 200 or alternate methods. Additionally, individual blocks may be deleted from the method 200 without departing from scope of the disclosure described herein. For ease of explanation, in the embodiments described below, the method 200 may be implemented in the above-described processor 15. At step 205, details of each child are provided to the attendance monitoring system 10. The details of each child may include, but not limited to, name of the child, name of father and mother, age, address, contact number, a photograph and so on. After receiving, the details of each child are stored in the memory 20. At step 210, the processor 15 is configured to generate a unique identification code for each child based on the information. In one example, the unique identification code may include a numeric or alphanumeric node. At step 215, the unique identification code corresponding to each child C is configured in an identity card 60. For example, considering that the RFID tag 62 is embedded in the identity card 60, then the unique identification code corresponding to a child C is configured with the RFID tag 62. At step 220, the card reader 50 is configured to recognize the RFID tags 62 corresponding to the unique identification code of child C.

Now referring to FIGS. 1 and 2, operation of the attendance monitoring system 10 is explained, in accordance with one implementation of the present disclosure. It should be understood that the attendance monitoring system 10 might be used to monitor number of children C present in the vehicle 100 at any given point of time. In order to monitor presence of children C in the vehicle 100, each of the children C are made to register their presence at the time of entering and exiting the vehicle 100. In one example, when the child C e.g., child named Anderson is entering the vehicle 100, then the card reader 50 may detect presence of the identity card 60 associated with the Anderson. After detecting the identify card, Anderson may press the first actuator 52 at the card reader 50 such that the attendance monitoring system 10 is updated indicating that the Anderson is in vehicle 100. Similarly, each of the children C may press the first actuator 52 to indicate their presence in the vehicle 100. Further, at the time of exiting the vehicle 100, each child C may press the second actuator 54 to indicate his exit from the vehicle 100. In one embodiment, the child C may manually enter his identification code using the keypad 56 provided at the card reader 50 to register his presence or exit from the vehicle 100.

Figure 5:
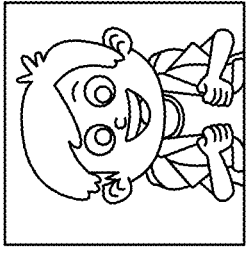
FIG. 5 illustrates an example of information displayed on a display unit 30 of the attendance monitoring system 10, in accordance with one embodiment of the present disclosure.

In another embodiment, the RFID tag 62 may be used to recognize presence of the child C in the vehicle 100. As such, the RFID reader 58 recognizes the identification code of the child C from the RFID tag 62 from the identity card 60 of the child C. As the child C enters the vehicle 100 through the entrance 110, the RFID reader 58 recognizes the RFID tag 62 from the identity card 60 of the child C and updates the presence of the child C with the attendance monitoring system 10. Similarly, as each of the children C enters the vehicle 100, the attendance monitoring system 10 is updated with the list of children C present in the vehicle 100. When the child C enters the vehicle 100, the card reader 50 recognizes the child C and transmits the signal to the attendance monitoring system 10. Upon receiving the signal, the information corresponding to the child C entered may be displayed on the display unit 30. The driver D of the vehicle 100 may view the photograph and/or information displayed of the child C on the display unit 30. At any given time, the driver D of the vehicle 100 or a user of the attendance monitoring system 10 may use the attendance monitoring system 10 to obtain information corresponding to number of children C present in the vehicle 100. In order to obtain the information, the user may operate the attendance monitoring system 10 using the interface 25 to retrieve information from the memory 20. For example, if the user wishes to obtain information of any child C, then the user may select the option of list of children C present in the vehicle C. Further, the user may select or click on the name of the child C to view his details such as name, parent's name, photograph and so on at the display unit 30, as shown in FIG. 5.

Figure 4:
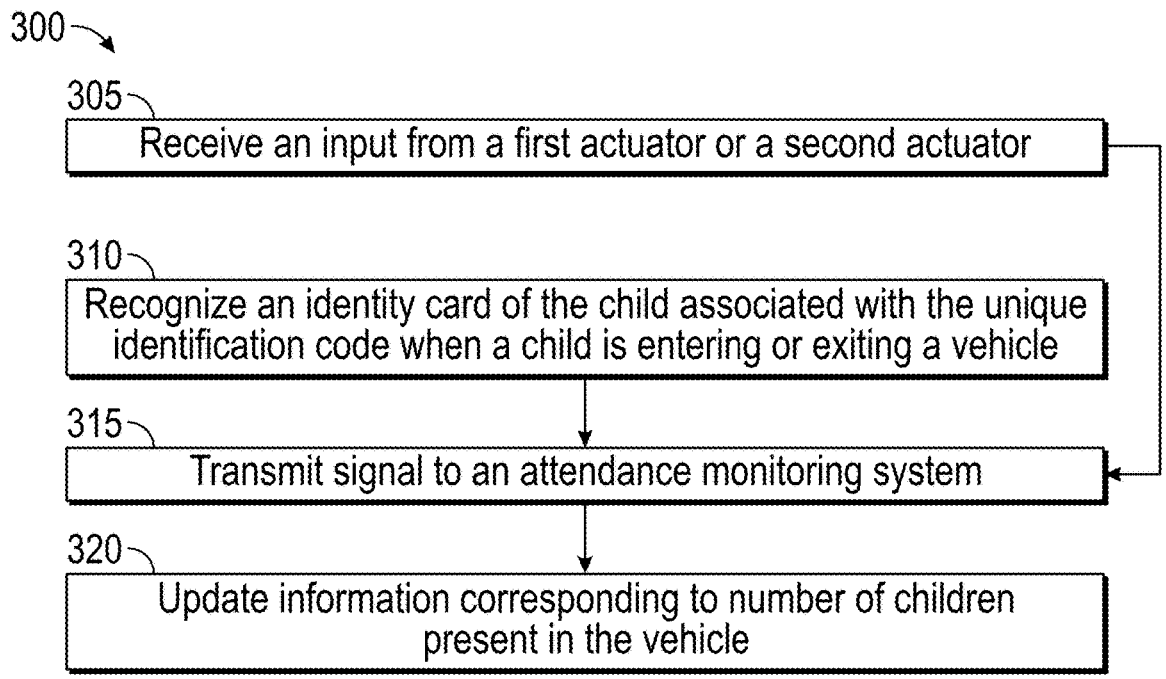
FIG. 4 illustrates a method 300 of monitoring presence of children C in a vehicle 100, in accordance with one embodiment of the present disclosure.

Now referring to FIG. 4, a method 300 for monitoring presence of children C in a vehicle 100 is shown, in accordance with an embodiment of the present disclosure. The method 300 may be described in the general context of computer executable instructions or a sequence of steps to be performed for automated checkout. However, the order in which the method 300 is described and is not intended to be construed as a limitation, and any number of the described method blocks can be combined in any order to implement the method 300 or alternate methods. Additionally, individual blocks may be deleted from the method 300 without departing from scope of the disclosure described herein. For ease of explanation, in the embodiments described below, the method 300 may be implemented in the above-described attendance monitoring system 10. At step 305, the attendance monitoring system 10 receives an input from one of the first actuator 52 and the second actuator 54. As specified above, the first actuator 52 might be used to log information corresponding to the child C entering the vehicle 100. Further, the second actuator 54 might be used to log information corresponding to child C exiting the vehicle 100. As such, operation of the first actuator 52 and the second actuator 54 are monitored to determine number of children C present in the vehicle 100. Alternatively, children C entering and existing the vehicle 100 is recognized using the RFID tag 62 provided in the identity card 60 issued to the children C, as shown in step 310. At step 315, the card reader 50 transmits signals to the attendance monitoring system 10 via the network 40. At step 320, the attendance monitoring system 10 is updated with information corresponding to the number of children C present in the vehicle 10. As specified, the attendance monitoring system 10 is updated with information corresponding to the number of children C present in the vehicle 10 at all times. As such, the user of the attendance monitoring system 10 may check details of the children C present in the vehicle 100 at any given time.

Based on the above, it is evident that the attendance monitoring system 10 might be used to determine number of children C present in the vehicle 100 at any given point of time. Further, the user of the attendance monitoring system 10 might check the details of each child as they enter or exit the vehicle 100. As such, the attendance-monitoring system 10 ensures that no child is left behind in the vehicle 100 and ensures safety of the child in the vehicle. The presence of the card reader 50 at the vehicle 100 is advantageous as it allows the child to enter his unique identification code to register his presence at the attendance monitoring system 10 even if the identity card 60 is forgotten or lost.

In one exemplary implementation, the information of the child may also include the location of the child's house. As such, when the child enters the vehicles, a route to reach the child's house may be displayed at the display unit 30 of the attendance monitoring system 10.

Although it is explained that the card reader 50 mounted at the vehicle 100 comprises the first actuator 52, the second actuator 54 and the keypad 56 that are activated when entering and exiting the vehicle 100, respectively, it should be understood that in one alternate implementation, the first actuator 52, the second actuator 54 and the keypad 56 might be provided in the identity card 60 that is worn by the child.

In such an alternate embodiment, the identity card is provided with the first actuator, the second actuator and the keypad and the need for card reader is eliminated. When the child enters the vehicle, the child may press the first actuator i.e., green button to update the attendance monitoring system of his presence in the vehicle. Further, at the time of exiting the vehicle, the child may press the second actuator i.e., red button to update attendance monitoring system of his exit from the vehicle. Alternatively, the child may use the keypad to enter the unique identification code to update his presence or exit from the vehicle. In the current implementation, the identity card may be worn as a tag or worn as a wearable device such as watch, bracelet, ring, etc. worn around a child's wrist, hand, forearm, etc. In order to establish communication between the identity card and the attendance monitoring system, the identity card might be provided with a second transceiver capable of transmitting and receiving information from the attendance monitoring system.

Although it is explained that the attendance monitoring system 10 is used for monitoring children presence in vehicle 100, the embodiments of the present disclosure might be applied to monitor presence of people in a building. As such, the attendance monitoring system might be implemented in schools, factories, exhibition halls, seminar venues, and other buildings for monitoring presence or movement of people or vehicles or equipment in the building. Additionally, the attendance monitoring system 10 might be implemented in a geo-location such as a playground or vicinity of school such that the presence of a child within the geo-location is tracked and updated to parents in real time. Alternatively, the attendance monitoring system may also be implemented in a prison for monitoring presence of inmates in the prison.

The drawings shown herein are provided for illustrative purpose only, and shape and size of each components illustrated should not be construed in limited sense. A person skilled in the art will appreciate that components may be added or deleted to incorporate additional features described in the present disclosure and even such disclosures will be within the scope of the present disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attendance monitoring system, comprising:
a monitoring module including a processor, wherein said monitoring module is a rectangular housing mounted to a dashboard of a bus vehicle, wherein said monitoring module further includes an interface, a display unit and a transceiver, said monitoring system further including a GPS system which provides a route corresponding to a child's home address;
a memory mounted to the processor, said memory storing information of a child consisting essentially of a name of said child, a mother's name, a father's name, an age of said child, an address of said child, a contact number of said child, and a photograph of said child, wherein said processor generates a unique identification code corresponding to said child, wherein said unique identification code is a numeric or alphanumeric code;
a card reader being a housing made of a metal material which is mounted at an entrance of said bus vehicle, wherein said housing is mounted on an outer surface of said bus vehicle next to said entrance, wherein the card reader is communicatively mounted to the processor; and
a plurality of identity cards, each configured to uniquely identify a child, wherein the card reader is configured to detect presence of the identity card associated with the child in said bus vehicle and transmits signals to the processor, and wherein the processor is used to monitor presence of the children in the vehicle based on the plurality of identity cards detected by the card reader at said entrance of said bus vehicle, wherein said plurality of identity cards includes said unique identification code generated from said processor.

2. The attendance monitoring system of claim 1, wherein the card reader comprises a first actuator and a second actuator.

3. The attendance monitoring system of claim 2, wherein the first actuator is actuated by the child when entering the vehicle and the second actuator is actuated by the child when exiting the vehicle.

4. The attendance monitoring system of claim 1, wherein each of the plurality of identity cards is provided with a Radio-Frequency Identification tag configured with a unique identification code associated with the child.

5. The attendance monitoring system of claim 4, wherein the card reader comprises a Radio-Frequency Identification reader configured to read the RFID tag.

6. The attendance monitoring system of claim 1, wherein said card reader further includes a keypad mounted thereon, wherein a child may manually input their information using said keypad.

7. The attendance monitoring system of claim 1, wherein said card reader is communicatively mounted to said attendance monitoring system through a network.

8. The attendance monitoring system of claim 1 wherein said unique identification code is generated based on the information of a child stored in said memory.

9. A student attendance and tracking system, consisting of:
a) a bus vehicle having an outer surface, said bus vehicle further including an entrance and a dashboard;
b) a monitoring module consisting of a processor, a database memory, an interface, a display unit, and a transceiver, wherein said monitoring module is mounted on said dashboard located behind a steering wheel, wherein said database memory stores information of a child consisting essentially of a name of said child, a mother's name of said child, a father's name of said child, an age of said child, an address of said child, a contact number of said child, and a photograph of said child, wherein said processor generates a unique identification code corresponding to said child based on said information provided stored in said database memory, wherein said unique identification code is a numeric or alphanumeric code, wherein said monitoring module further includes a GPS system that provides said display with a route corresponding to said address of said child;
c) a card reader including a housing made of a metal material which is mounted to said outer surface of said bus vehicle located next to said entrance, wherein said card reader houses a first actuator, a second actuator, an RFID reader, and a keypad, wherein said housing is rectangular in shape, wherein said first actuator and said second actuator are provided as circular buttons located above said keypad;
d) a network, wherein said card reader is in wireless communication with said monitoring module through said network; and
e) a plurality of identity cards including tracking sensors, wherein said sensors are provided as radio frequency identifications tags in communication with said card reader, wherein the card reader is configured to detect presence of said plurality of identity cards associated with said child of said bus vehicle and transmits signals to the processor, and wherein the processor is used to monitor presence of the children in the vehicle based on the plurality of identity cards detected by the card reader at said entrance of said bus vehicle, wherein said plurality of identity cards contains said unique identification code generated from said processor.

* * * * *